(12) United States Patent
Liao

(10) Patent No.: US 6,502,777 B2
(45) Date of Patent: Jan. 7, 2003

(54) WIRE-WINDING BOX CAPABLE OF UNIDIRECTIONALLY WINDING WIRE

(76) Inventor: Sheng Hsin Liao, No. 10, Alley 38, Lane 229, San Chun St., Shulin, Taipei Hsien (TW)

(*) Notice: Subject to any disclaimer, the term of this patent is extended or adjusted under 35 U.S.C. 154(b) by 0 days.

(21) Appl. No.: 09/860,545

(22) Filed: May 21, 2001

(65) Prior Publication Data

US 2002/0170999 A1 Nov. 21, 2002

(51) Int. Cl.[7] ............................................. B65H 75/48
(52) U.S. Cl. ...................................................... 242/373
(58) Field of Search .............................. 242/373, 375, 242/376, 377, 379, 378.2, 378; 191/12.2 R, 12.4, 12

(56) References Cited

U.S. PATENT DOCUMENTS

| | | | | |
|---|---|---|---|---|
| 2,976,374 A | * | 3/1961 | Poulsen | 191/12.4 |
| 3,056,863 A | * | 10/1962 | Johnson | 191/12.4 |
| 4,384,688 A | * | 5/1983 | Smith | 191/12.2 R |
| 4,499,341 A | * | 2/1985 | Boyd | 191/12.4 |
| 4,713,497 A | * | 12/1987 | Smith | 191/12.2 R |
| 4,940,859 A | * | 7/1990 | Peterson | 191/12.2 R |
| D363,461 S | * | 10/1995 | Duckman et al. | |
| 5,819,893 A | * | 10/1998 | Wagner et al. | 191/12.4 |
| 6,337,444 B1 | * | 1/2002 | Liao | |
| 6,375,109 B1 | * | 4/2002 | Liao | 242/378 |

* cited by examiner

Primary Examiner—William A. Rivera
(74) Attorney, Agent, or Firm—Rosenberg, Klein & Lee

(57) ABSTRACT

A unidirectional wire-winding box comprises a box body, a wire-winding disk, a communication wire, and a scroll spring. The box body has a receiving room therein to receive the communication wire, the wire-winding disk, and the scroll spring. The box body has two wire holes. A disk body of the wire-winding disk has a wire-winding shaft with a wire groove thereon. The wire-winding disk is pivotally disposed in the box body. The communication wire is wound around the wire-winding shaft. One end of the communication wire protrudes out from a wire hole, and the other end thereof penetrates into the wire-winding shaft form the wire groove and then protrudes out from the other wire hole. The wire groove has locating parts therein to fix the communication wire. The scroll spring is connected between the box body and the wire-winding disk.

10 Claims, 11 Drawing Sheets

the above prior art wire-winding box has inconvenience and drawbacks in practical use. The present invention aims to resolve the problems.

WIRE-WINDING BOX CAPABLE OF UNIDIRECTIONALLY WINDING WIRE

FIELD OF THE INVENTION

The present invention relates to a wire-winding box capable of unidirectionally winding a wire and, more particularly, to a unidirectional wire-winding box, which can apply to various kinds of communication apparatuses and be used for pulling a communication wire of required length and automatically winding the wire so that disorder and entanglement of wire can be avoided.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external wire or inconvenience of use due to a too-short length of external wire, several kinds of wire-winding boxes applicable to various kinds of communications apparatuses have been proposed. As shown in FIG. 1, a conventional wire-winding box comprises a box body 10a, a communication wire 11a, and a winding disk (not shown) and a scroll spring (not shown) disposed in the box body 10a. Plugs 12a and 13a at two ends of the communication wire 11a can thus be plugged into sockets of relevant communication apparatuses for communication of information.

A communication wire may show a tight state due to resiliency of the scroll spring when it is pulled out from a conventional wire-winding box so that a proper length of the communication wire cannot be kept outside, resulting in much trouble in use for a user. To resolve this problem, in some wire-winding boxes, a swing sheet capable of resiliently swinging is utilized, and gaps and locking grooves disposed at the periphery of a rotating disk are matched, thereby accomplishing winding or locating function.

However, in the above prior art wire-winding box, when the plugs at two ends of the communication wire are pulled out and plugged into sockets of relevant communication apparatuses, the box body is situated at the midway of the communication wire. If the communication wire is hung in the air at this time, the box body will depress the communication wire, hence pulling downwards the communication apparatuses connected at two ends of the communication wire. Improper tension will be generated between the communication wire and the communication equipments, thus resulting in damage of the communication wire, the plugs, and the sockets. Moreover, the communication apparatuses may even be moved to fall off to the ground.

Accordingly, the above prior art wire-winding box has inconvenience and drawbacks in practical use. The present invention aims to resolve the problems.

SUMMARY OF THE INVENTION

The primary object of the present invention is to provide a unidirectional wire-winding box, wherein one end of a communication wire thereof can be pulled out directly from the wire-winding box, and the other end of the communication wire can be fixed by locating parts and thus cannot be pulled out from the wire-winding box, thus forming a wire-winding box capable of unidirectionally winding the wire. Because two ends of the communication wire cannot be pulled out simultaneously, when plugs connected at two ends of the communication wire are plugged into sockets of relevant communication apparatuses, the box body will abut on one plug. That is, the box body will be situated near one communication apparatus. Thereby, even if the communication wire is hung in the air, the communication wire will not be depressed and sway, and the communication apparatuses connected at two ends of the communication wire will not be pulled downwards to generate improper tension between the communication wire and the communication apparatuses. Therefore, damage of the communication wire, the plugs, and the sockets can be avoided, and the situation that the communication apparatuses fall off to the ground can be prevented.

To achieve the above object, the present invention provides a unidirectional wire-winding box, which comprises a box body, a wire-winding disk, a communication wire, and a scroll spring. The box body has a receiving room disposed therein. The box body has a first wire hole and a second wire hole on the sidewall thereof. The wire-winding disk has a disk body with a hollow wire-winding shaft disposed thereon. The wire-winding shaft has a wire groove thereon. The wire-winding disk is pivotally disposed in the receiving room of the box body.

The communication wire is wound around the wire-winding shaft of the wire-winding disk. One end of the communication wire protrudes out from the first wire hole of the box body, and the other end thereof penetrates into the wire-winding shaft from the wire groove and protrudes out from the second wire hole of the box body. The wire groove of the wire-winding shaft has two locating parts disposed therein to fix the communication wire. The scroll spring is connected between the box body and the wire-winding disk. A wire-winding box capable of unidirectionally winding a wire is thus formed.

The various objects and advantages of the present invention will be more readily understood from the following detailed description when read in conjunction with the appended drawings, in which:

DETAILED DESCRIPTION OF THE PREFERRED EMBODIMENTS

Figure 1:
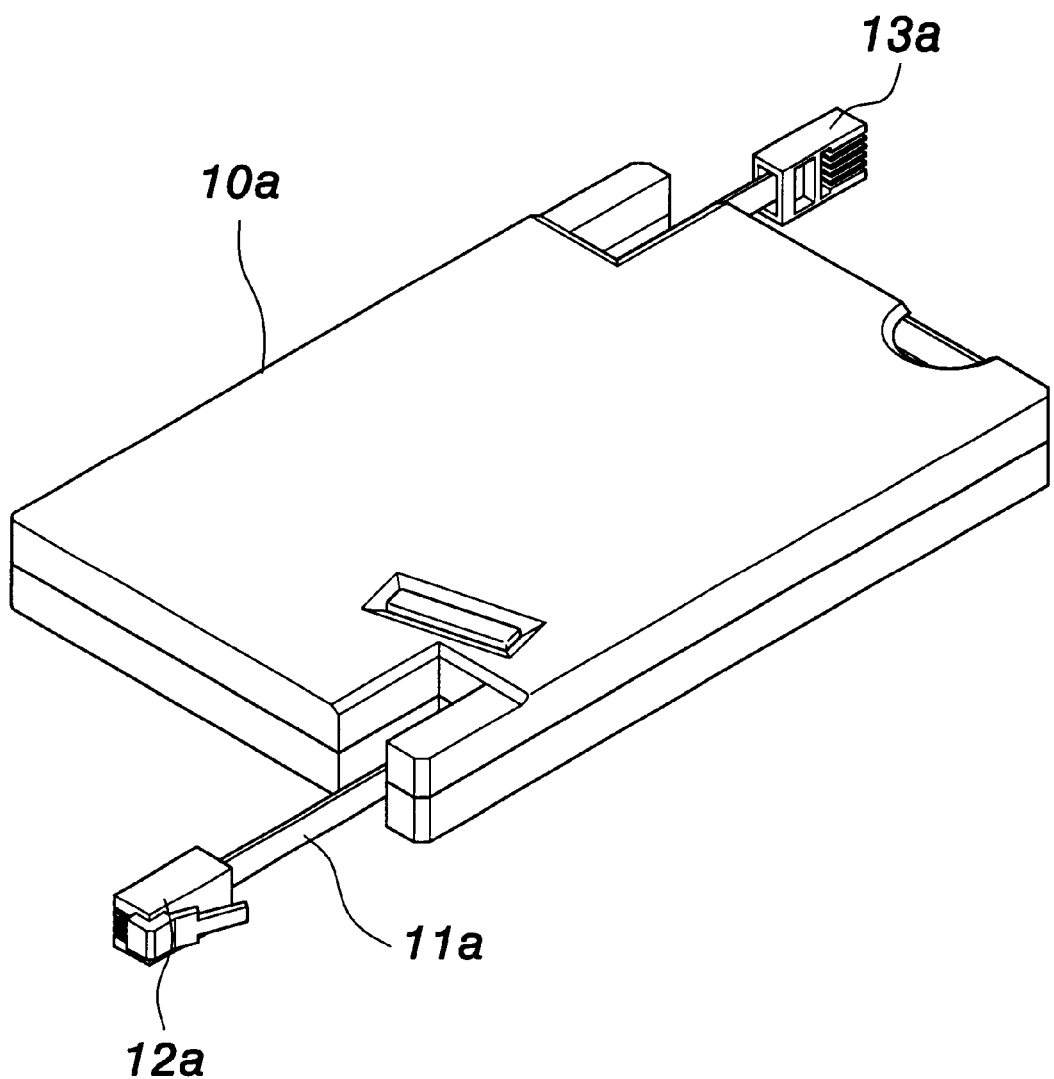
FIG. 1 is a perspective view of a prior art wire-winding box.
Figure 2:
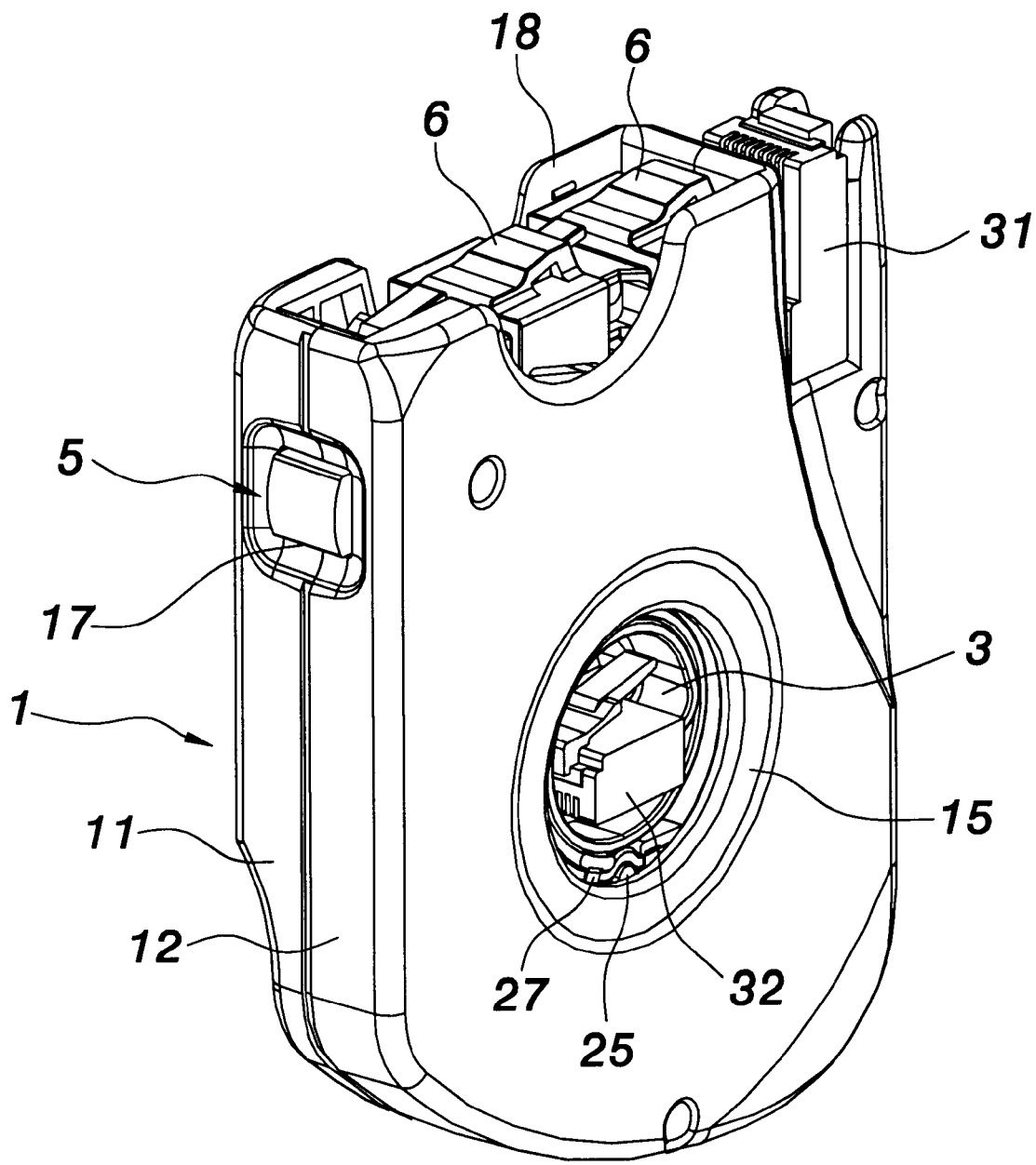
FIG. 2 is a perspective view of the present invention.
Figure 3:
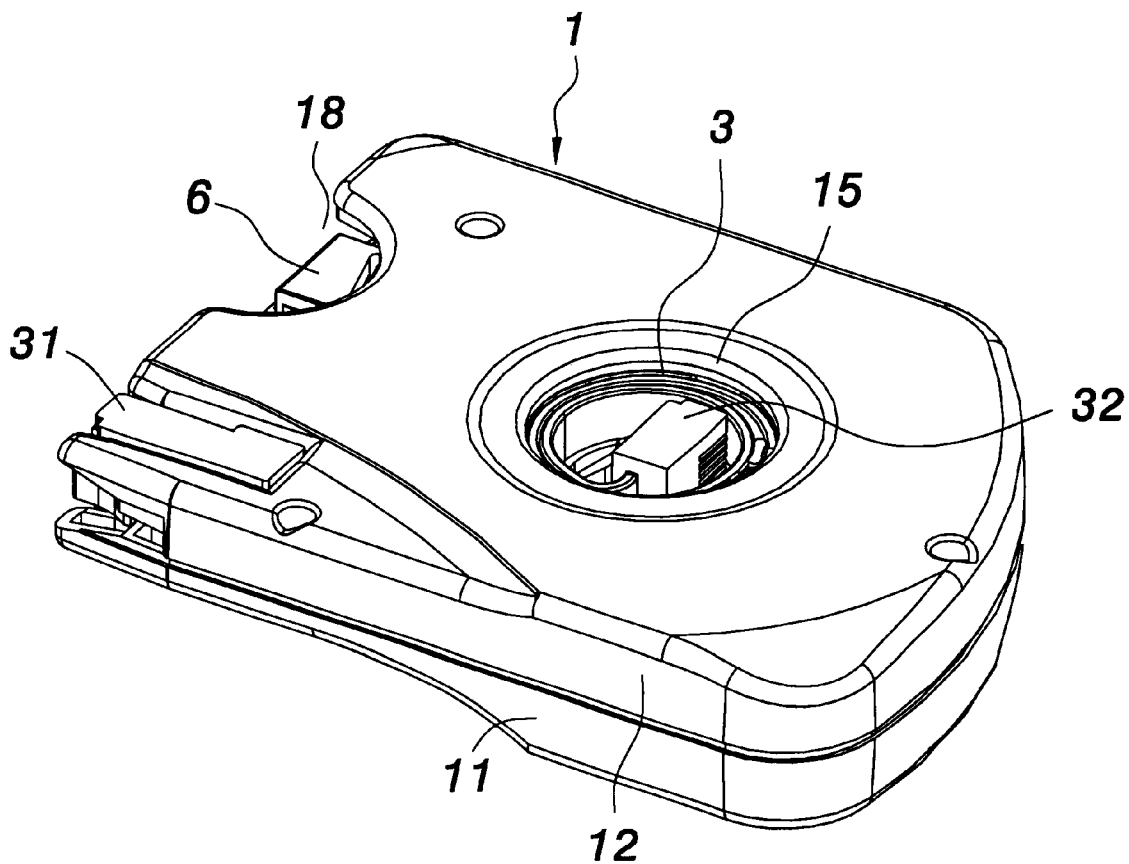
FIG. 3 is another perspective view of the present invention.
Figure 4:
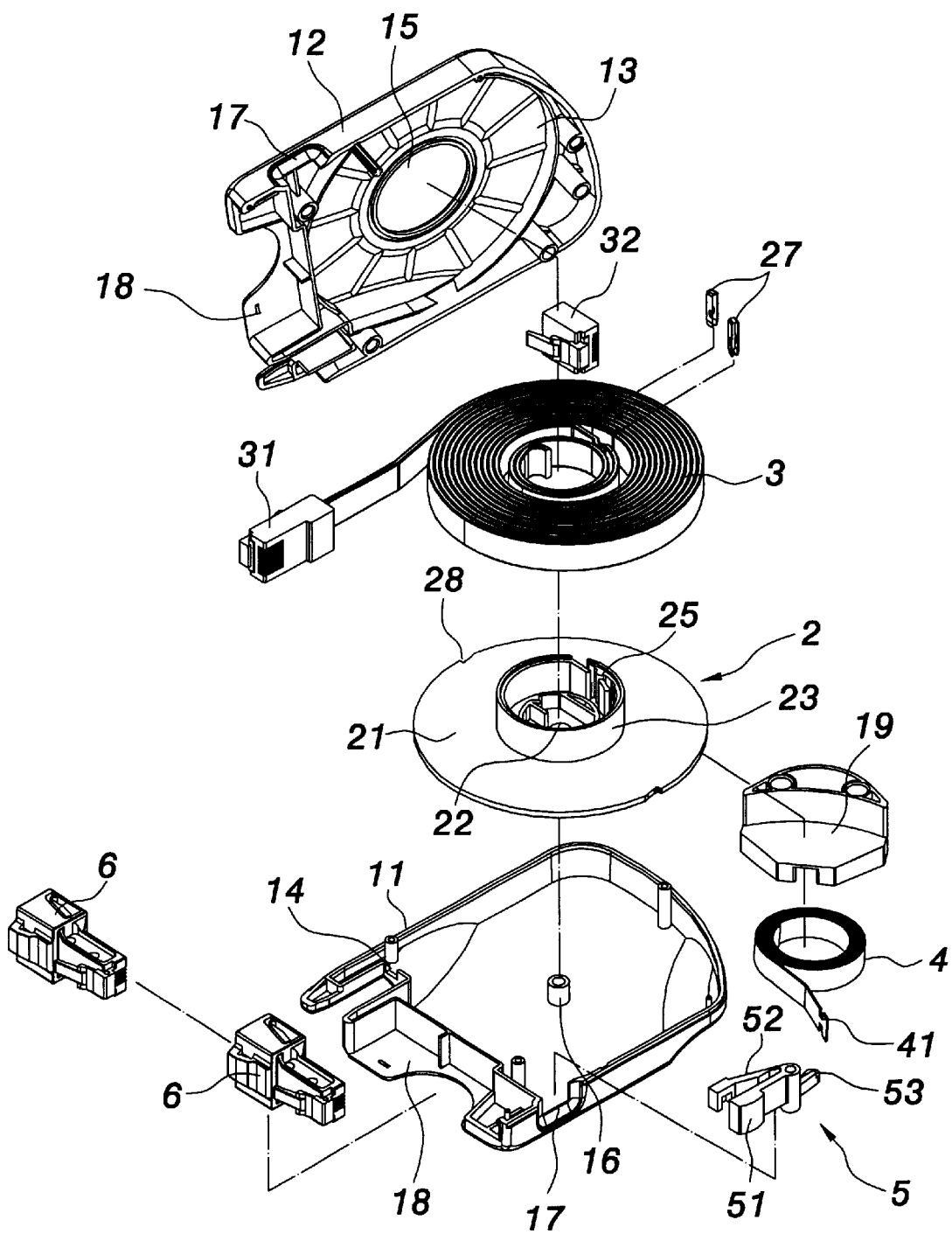
FIG. 4 is an exploded perspective view of the present invention.
Figure 5:
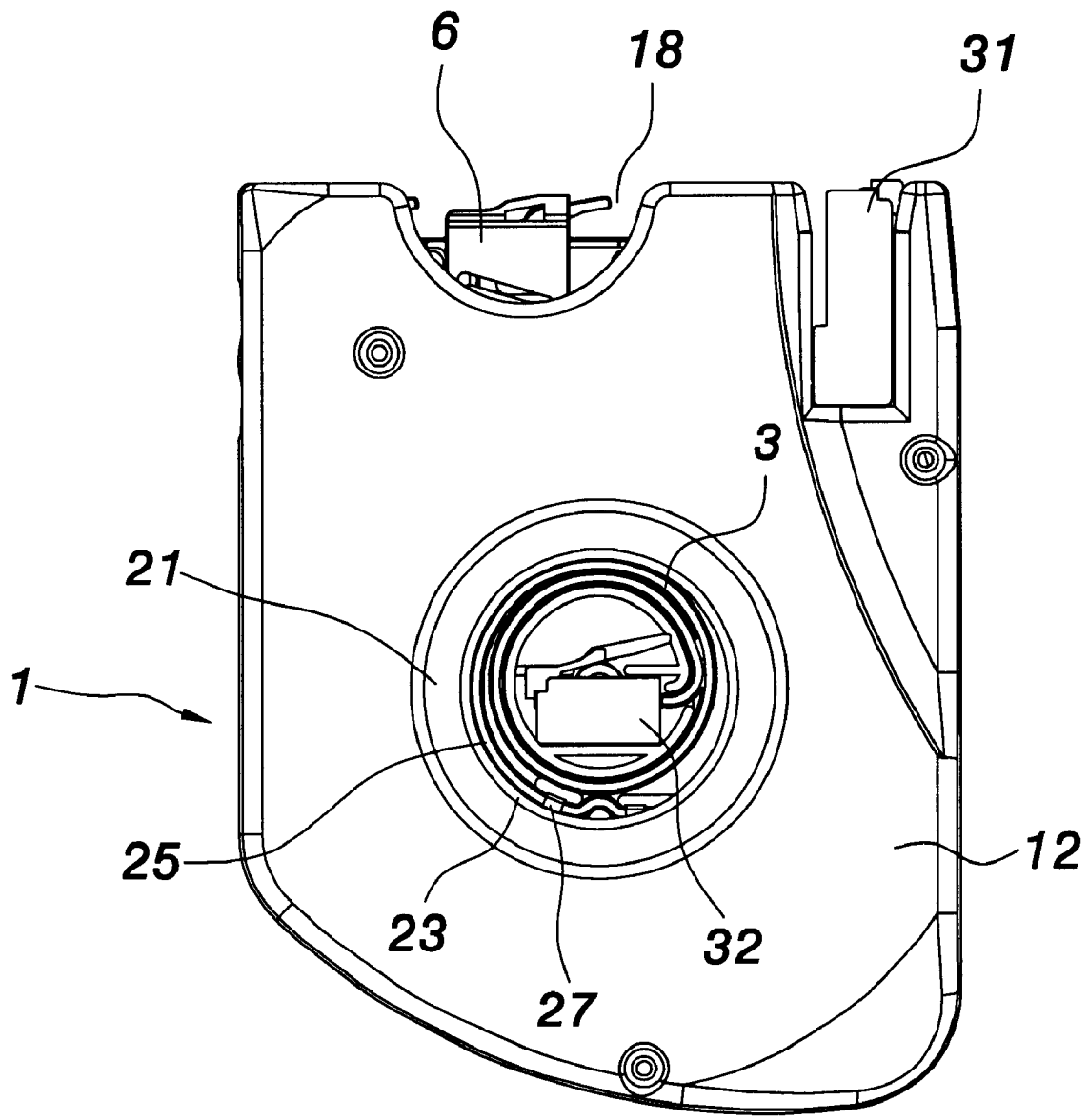
FIG. 5 is a plan view of the present invention.

As shown in FIGS. 2 to 10, a wire-winding box capable of unidirectionally winding a wire according to a preferred embodiment of the present invention comprises a box body 1, a wire-winding disk 2, a communication wire 3, and a scroll spring 4.

The box body 1 a hollow shell body formed by locking or screwing a first half body 11 and a second half body 12. The box body 1 has a depressed receiving room 13 disposed therein to receive the communication wire 3, the wire-winding disk 2, and the scroll spring 4. The box body 1 has a first wire hole 14, a second wire hole 15, and a through hole 17 at proper positions of the sidewall thereof. The first wire hole 14 is used for the protruding out of one end of the communication wire 3. The second wire hole 15 is used for the protruding out of the other end of the communication wire 3. The through hole 17 is matched with a control button 51. The receiving room 13 has a hollow projective shaft 16 on the inner side face thereof.

The wire-winding disk 2 has a disk body 21 with a central axial hole 22 thereon. The disk body 21 has a hollow wire-winding shaft 23 and a spring-fixing post 24 respectively disposed on two faces thereof. The wire-winding shaft 23 has a wire groove 25 matched with two locating parts 27. The spring-fixing post 24 has a locking hole 26 thereon. The wire-winding disk 2 is received in the receiving room 13 of the box body 1. The wire-winding disk 2 is pivotally disposed on the projective shaft 16 through the axial hole 22 so that the wire-winding disk 2 can rotate in the receiving room 13.

Two ends of the communication wire 3 can join devices such as plugs 31 and 32 to be plugged into sockets of relevant communication apparatuses. The communication wire 3 is wound around the wire-winding shaft 23 of the wire-winding disk 2. One end of the communication wire 3 protrudes out from the first wire hole 14 of the box body 1. The other end of the communication wire 3 penetrates into the wire-winding shaft 23 from the wire groove 25 and then protrudes out from the second wire hole 15 of the box body 1. The locating parts 27 are embedded into the wire groove 25 of the wire-winding shaft 23 to fix the end of the communication wire 3.

The scroll spring 4 is properly located in the receiving room 13 of the box body 1. A bearing seat 19 can also be disposed in the receiving room 13 of the box body 1 so that the scroll spring 4 can be received between the bearing seat 19 and the shell wall of the box body 1. A locking end 41 of the scroll spring 4 is locked in the locking hole 26 of the wire-winding disk 2 to let the scroll spring 4 and the wire-winding disk 2 be joined together. The scroll spring 4 is disposed between the box body 1 and the wire-winding disk 2. When the wire-winding disk 2 rotates, the scroll spring 2 can store kinetic energy.

In practical use, the wire-winding box can be utilized to receive the communication wire 3 of considerable length, and the communication wire 3 can be wound back at any time. A user can plug the plugs 31 and 32 into sockets of relevant communication apparatuses for communication of information. The plug 31 at one end of the communication wire 3 can be pulled out from the wire-winding box, and a certain restoring tensile force is kept at the end of the communication wire 3 due to the action of the scroll spring 4 in the box. The communication wire 3 can be successfully wound back into the box so that entanglement of the external wire can be avoided. Because the plug 32 at the other end of the communication wire 3 is fixed by the locating parts 27, it cannot be pulled out from the wire-winding box.

To prevent disturbance of the tensile force to a user when he pulls out the communication wire 3, a plurality of locking grooves 28 having unidirectional locking function are disposed at the periphery of the disk body 21 of the wire-winding disk 2, and a control device 5 is disposed adjacent to the wire-winding disk 2. The control device 5 comprises a control button 51 properly and pivotally disposed in the box body 1. A resilient arm 52 is formed inside the control button 51 to properly shore up the inside of the box body 1 for providing restoring force to the control button 51 so that the control button 51 can protrude out of the through hole 17 and be pressed by the user. The control button 5 extends toward the rotation path of the locking grooves 28 of the wire-winding disk 2 to form a locking lump 53, which can block the locking grooves 28 timely to catch the wire-winding disk 2 when the wire-winding disk 2 rotates.

Figure 6:
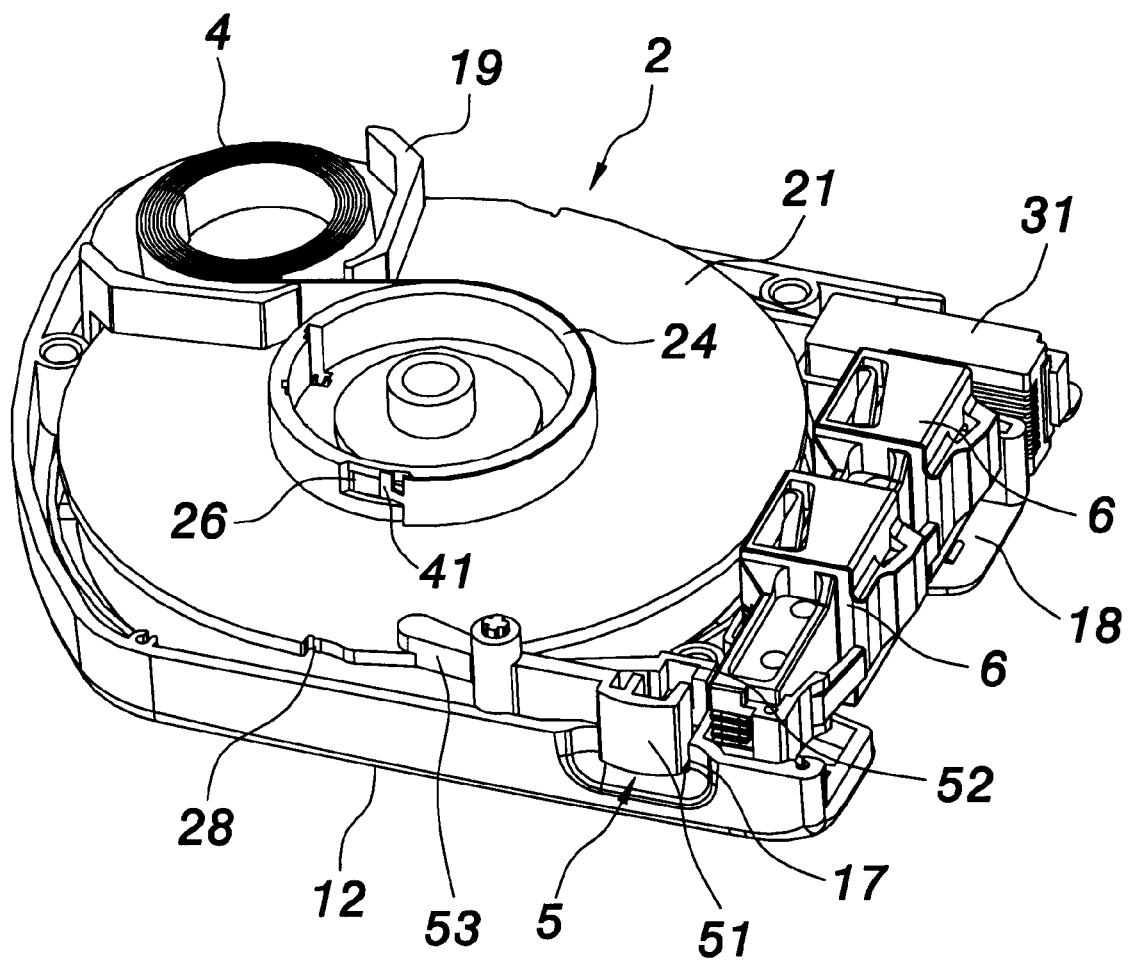
FIG. 6 is a perspective view of the internal structure of the present invention.
Figure 7:
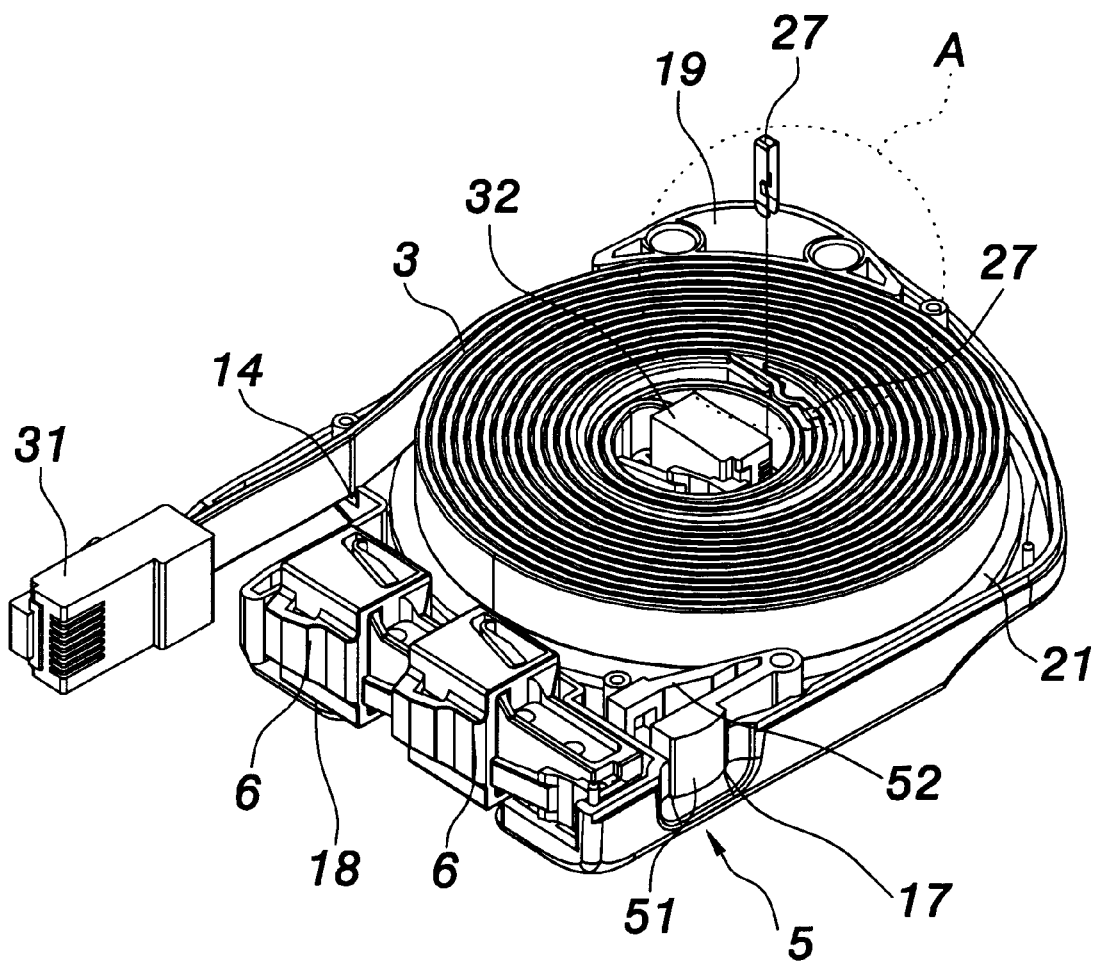
FIG. 7 is another perspective view of the internal structure of the present invention.
Figure 8:
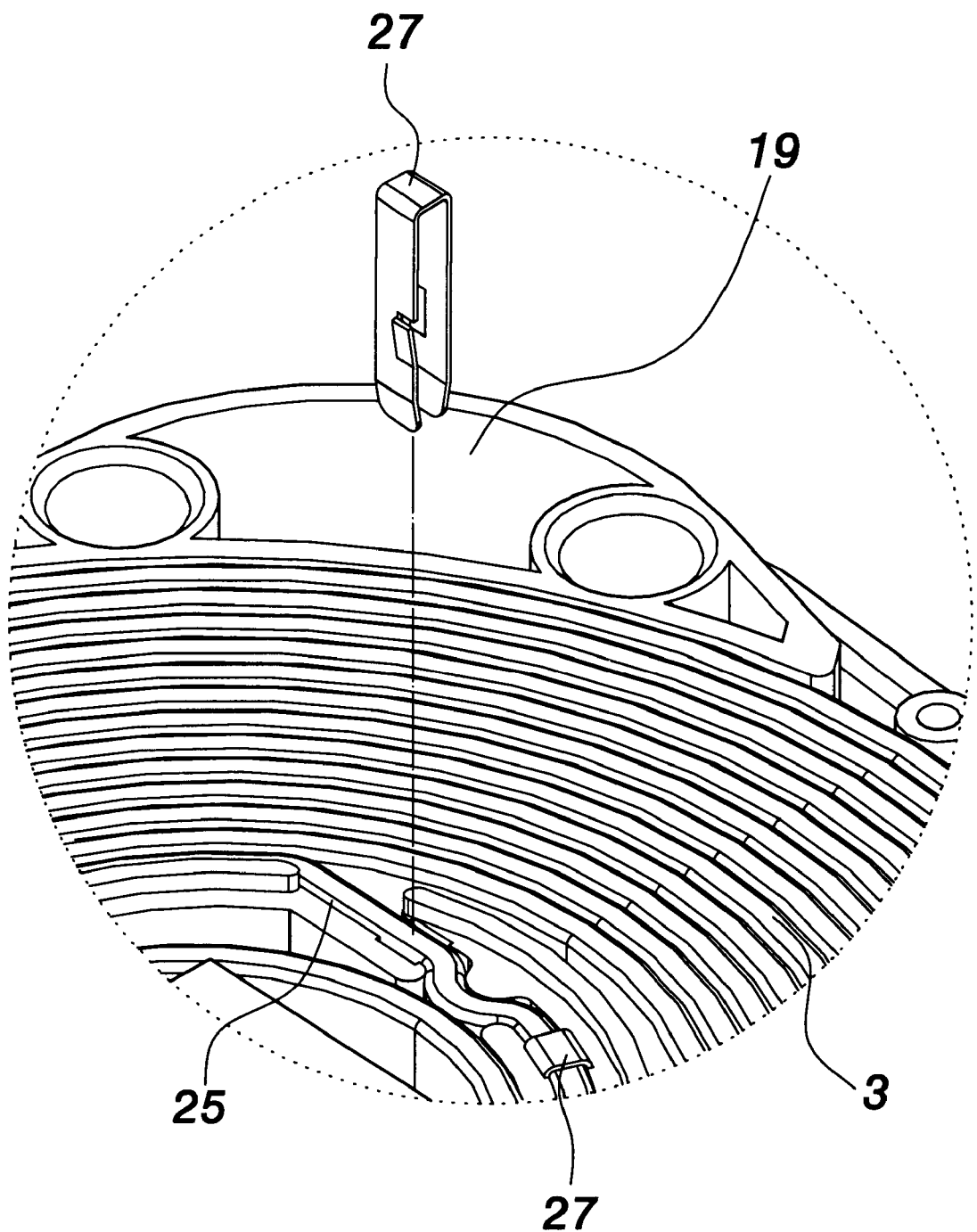
FIG. 8 is an enlarged view of part A in FIG. 7.
Figure 9:
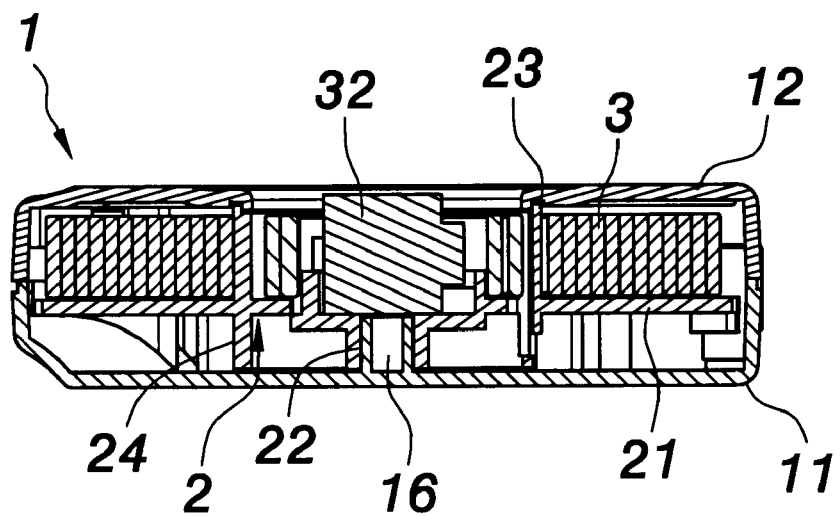
FIG. 9 is a cross-sectional view of the present invention.
Figure 10:
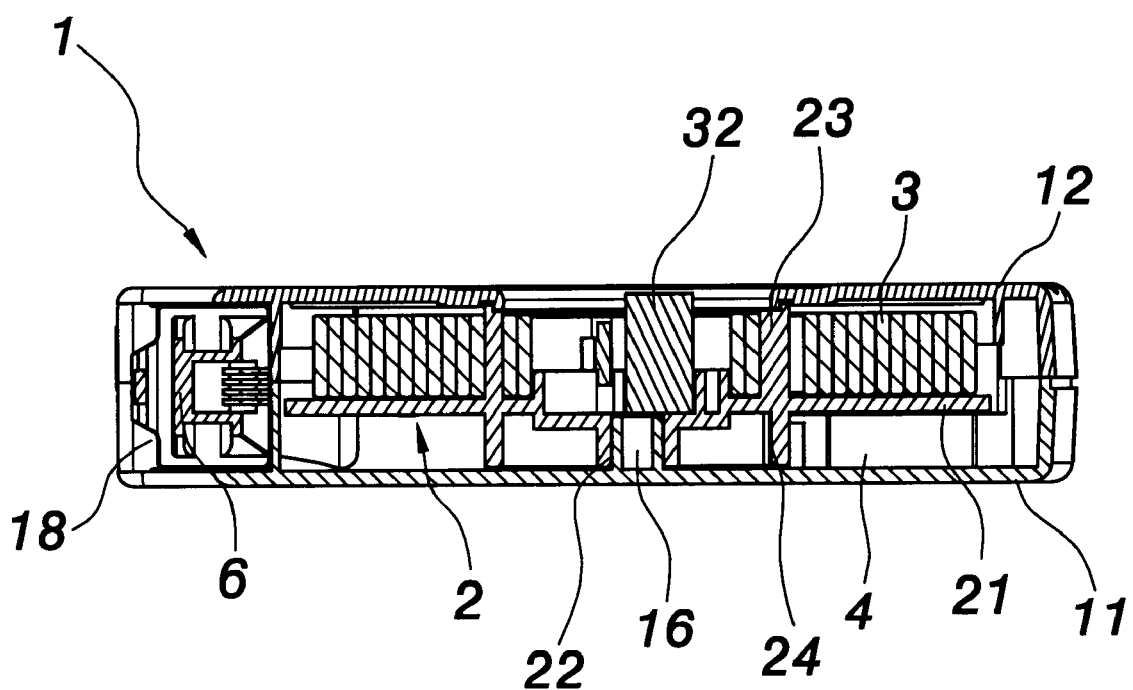
FIG. 10 is another cross-sectional view of the present invention.

When being pushed by the resilient arm 52, the wire-winding disk 2 will rotate counterclockwise, as shown in FIG. 6. The locking lump 52 of the control button 51 will catch the locking grooves 28 of the wire-winding disk 2 to block the rotation of the wire-winding disk 2. When the communication wire 3 is pulled out to let the wire-winding disk 2 rotate clockwise, as shown in FIG. 6, the locking grooves 28 can make use of bevels to smoothly detach from the locking lump 53 so that the wire-winding disk 2 can rotate continually, hence facilitating the pulling out of the communication wire 3.

When the communication wire 3 of a required length is pulled out, a uniform resilient force generated by the scroll spring 4 will act on the wire-winding disk 2 so that the wire-winding disk 2 will be caught by the locking lump 53, hence restricting the rotation of the wire-winding disk 2. Therefore, the communication wire 3 will not be wound back, and the communication wire 3 of this length can be kept outside. Once the user presses the control button 51 to let the locking lump 53 detach from the locking grooves 28, the wire-winding disk 2 can restore to the rotating action to quickly wind the communication wire 3 back.

Additionally, the box body 1 can have a receiving tank 18 thereon. The receiving tank 18 can receive adapting heads 6 of different specifications. The adapting heads 6 can be joined with the plugs 31 and 32 of the communication wire 3 to correspond to sockets of communication apparatuses of different specifications.

Figure 11:
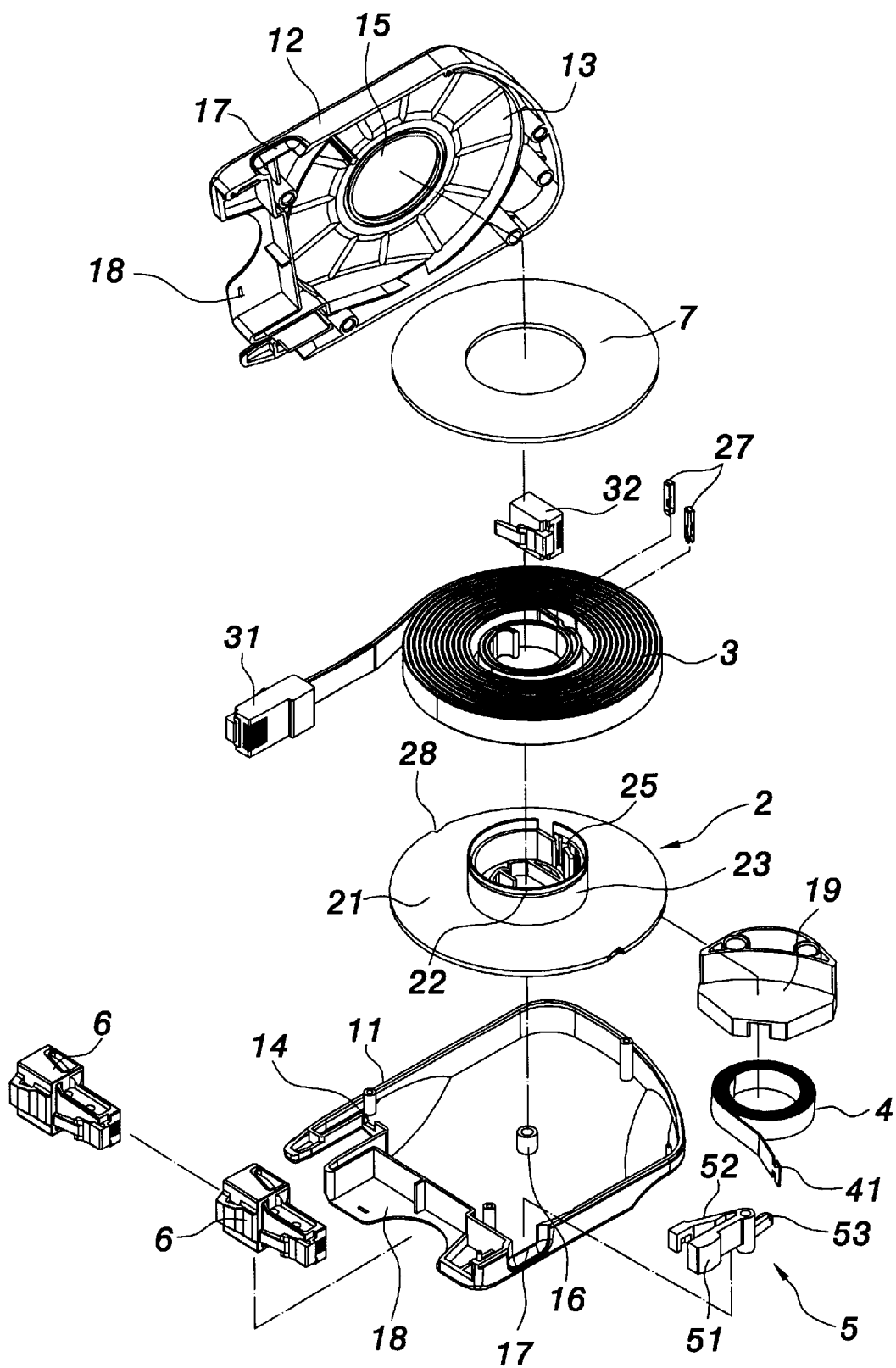
FIG. 11 is an exploded perspective view according to another embodiment of the present invention.
Figure 12:
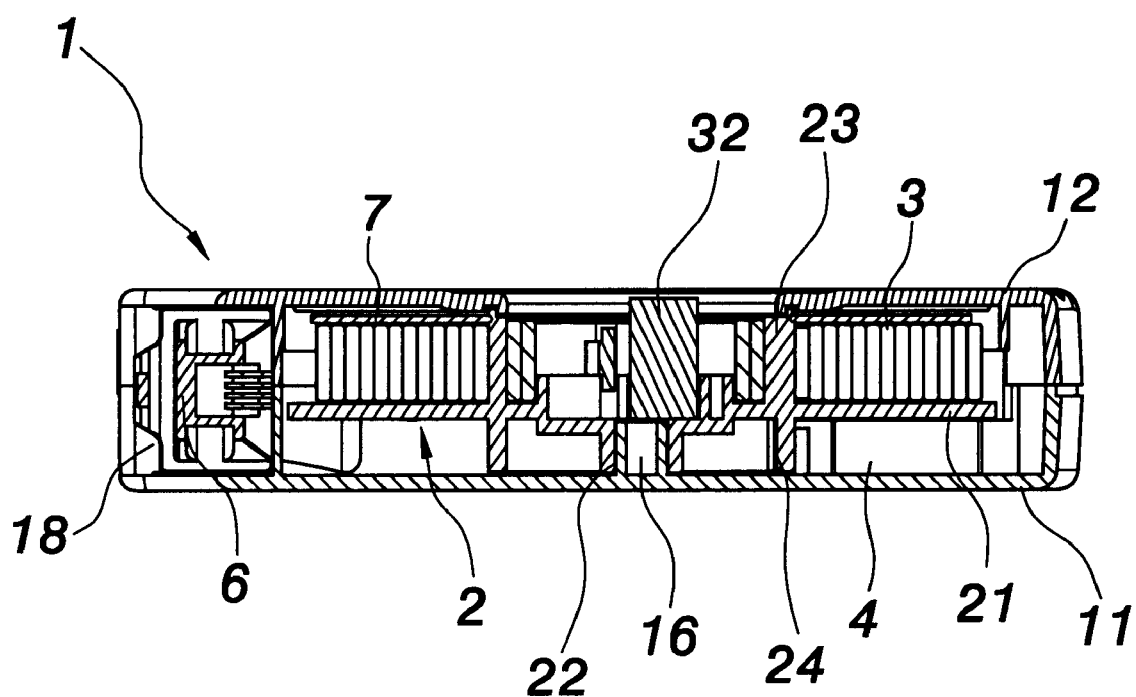
FIG. 12 is a cross-sectional view according to another embodiment of the present invention.

Furthermore, in the present invention, an annular cover body 7 can also be disposed in the box body 1, as shown in FIGS. 11 and 12. The cover body 7 is situated at one side of the communication wire 3 to locate and protect the communication wire 3.

To sum up, in the present invention, only one end of the communication wire 3 can be pulled out directly from the wire-winding box, and the other end of the communication wire 3 is fixed by the locating parts 27 and thus cannot be pulled out from the wire-winding box, hence forming a wire-winding box capable of unidirectionally winding the wire. Because the plugs 31 and 32 at two ends of the communication wire 3 cannot be pulled out simultaneously, when the plugs 31 and 32 are plugged into sockets of relevant communication apparatuses, the box body 1 will abut on the plug 32. That is, the box body will be situated near one communication apparatus.

Thereby, even if the communication wire 3 is hung in the air, it will not be depressed and sway, and the communication apparatuses connected at two ends thereof will not be pulled downwards to generate improper tension between the communication wire 3 and the communication apparatuses. Therefore, damage of the communication wire, the plugs, and the sockets can be avoided, and the situation that the communication apparatuses fall off to the ground can be prevented.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A wire-winding box for unidirectionally winding a wire, comprising:
   - a box body having a receiving room therein, said box body having a first wire hole formed therethrough and a second wire hole formed through a sidewall thereof;
   - a wire-winding disk having a disk body, said disk body having a hollow wire-winding shaft thereon, said wire-winding shaft having a wire groove formed therein, said wire-winding disk being rotatably disposed in said receiving room of said box body;
   - a communication wire wound around said wire-winding shaft of said wire-winding disk, a first end of said communication wire protruding out from said first wire hole of said box body and being unwound from said wire-winding shaft responsive to a pulling force applied thereto, a second end portion of said communication wire extending through said wire groove to pass into a central cavity of said wire-winding shaft and then protruding out from said second wire hole of said box body;
   - a pair of locating parts engaged with said wire-winding shaft within said wire groove and securing said second end portion of said communication wire within said wire groove against being unwound from said wire-winding shaft; and,
   - a scroll spring connected between said box body and said wire-winding disk.

2. The wire-winding box capable of unidirectionally winding a wire as claimed in claim 1, wherein said box body is a hollow shell body formed by locking or screwing a first half body and a second half body.

3. The wire-winding box for unidirectionally winding a wire as claimed in claim 1, wherein said box body has a projective shaft disposed on an inner side face of said receiving room thereof, said disk body of said wire-winding disk has a central axial hole, and said wire-winding disk is rotatably disposed on said projective shaft of said box body through said axial hole.

4. The wire-winding box capable of unidirectionally winding a wire as claimed in claim 1, wherein said box body has a receiving tank to receive adapting heads.

5. The wire-winding box capable of unidirectionally winding a wire as claimed in claim 1, wherein said box body has an annular cover body therein, and said cover body is situated at one side of said communication wire.

6. The wire-winding box capable of unidirectionally winding a wire as claimed in claim 1, wherein a bearing seat is disposed in said receiving room of said box body, and said scroll spring is disposed between said bearing seat and said box body.

7. The wire-winding box capable of unidirectionally winding a wire as claimed in claim 1, wherein said wire-winding disk has a spring-fixing post thereon, said spring-fixing post having a locking hole thereon, a locking end of said scroll spring being locked in said locking hole of said wire-winding disk to let said scroll spring and said wire-winding disk be joined together.

8. The wire-winding box for unidirectionally winding a wire as claimed in claim 1, wherein a plurality of locking grooves having a unidirectional locking function are disposed at a periphery of said disk body of said wire-winding disk, and a control device is disposed adjacent to said wire-winding disk, said control device comprising a control button, a resilient arm, and a locking lump, said resilient arm providing a restoring force to said control button so that said control button can protrude out from a through hole formed in the sidewall of said box body and be pressed by a user, said locking lump blocking said locking grooves to timely catch said wire-winding disk when said wire-winding disk rotates.

9. The wire-winding box capable of unidirectionally winding a wire as claimed in claim 1, wherein said wire groove of said wire-winding shaft of said wire-winding disk has locating parts therein to fix one end of said communication wire.

10. The wire-winding box capable of unidirectionally winding a wire as claimed in claim 1, wherein either end of said communication wire joins a plug.

* * * * *